Feb. 18, 1930.                C. J. W. CLASEN                1,748,035
                              RAILWAY CAR TRUCK
                            Filed July 26, 1928          2 Sheets-Sheet 1

INVENTOR
C.J.W. Clasen
BY  Evans + McCoy
ATTORNEY

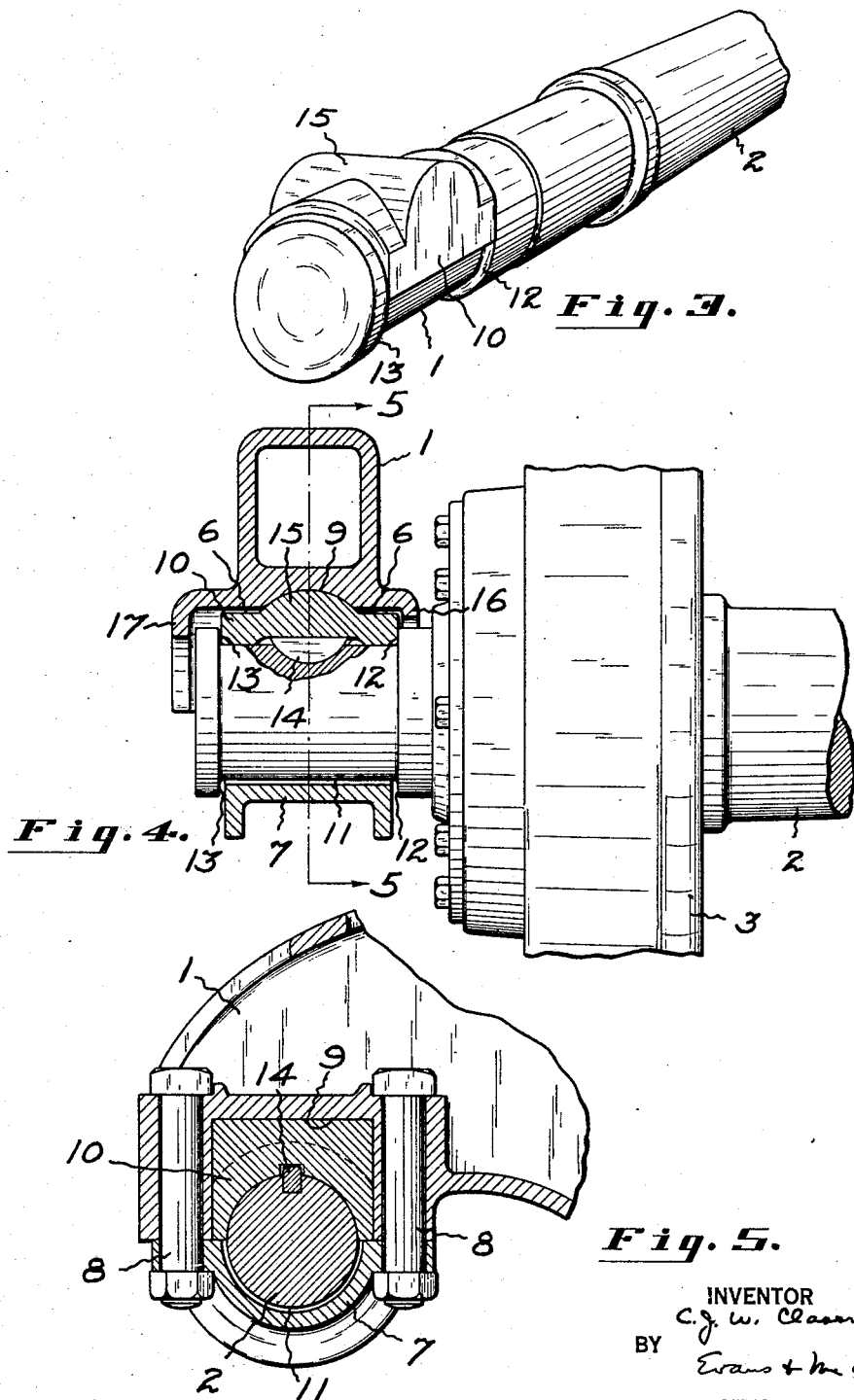

Patented Feb. 18, 1930

1,748,035

UNITED STATES PATENT OFFICE

CLAUS J. WERNER CLASEN, OF DAVENPORT, IOWA, ASSIGNOR TO THE BETTENDORF COMPANY, OF BETTENDORF, IOWA, A CORPORATION OF IOWA

RAILWAY-CAR TRUCK

Application filed July 26, 1928. Serial No. 295,458.

This invention relates to railway car trucks and more particularly to car trucks in which the axles are non-rotatably mounted at their ends in the side frame members and the supporting wheels are mounted to rotate on the axles.

The present invention has for its object to provide a car truck in which the non-rotatable axles are so mounted in the frame members that limited relative rocking movements are permitted so that in passing over an uneven track, each of the wheels of the truck may follow its rail without exerting bending stresses on the axles.

A further object is to provide a flexible mounting for the non-rotatable axles which will permit any corner of the truck to be moved freely up and down in passing over high or low spots along the rail, but which also rigidly holds the side frame members at right angles to the axles and prevents the wheels on one side of the truck leading those on the opposite side.

With the above and other objects in view, the invention may be said to comprise the truck as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 3 is a perspective view of an axle with the bearing saddle thereon.

Fig. 4 is a section taken on the line indicated at 4—4 in Fig. 2.

Fig. 5 is a section taken on the line indicated at 5—5 in Fig. 4.

Figure 1:
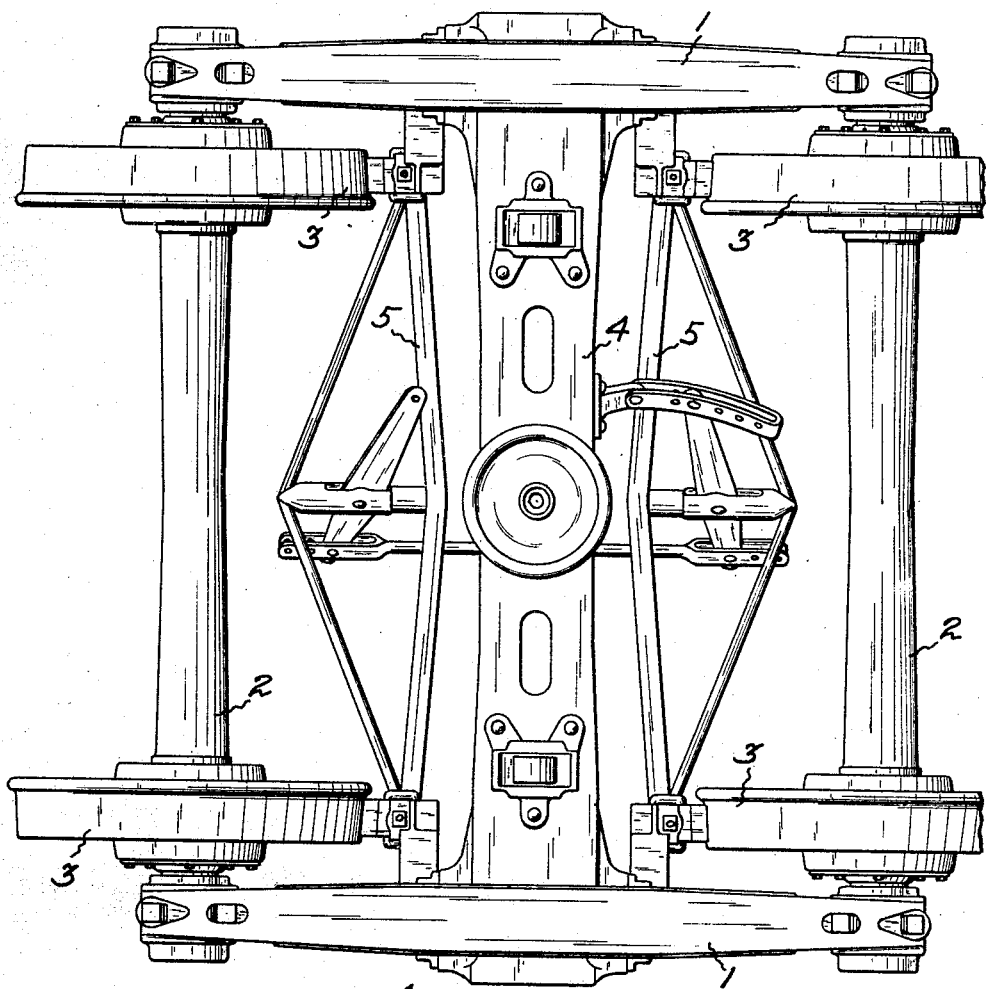
Figure 1 is a plan view of a truck embodying the invention.
Figure 2:
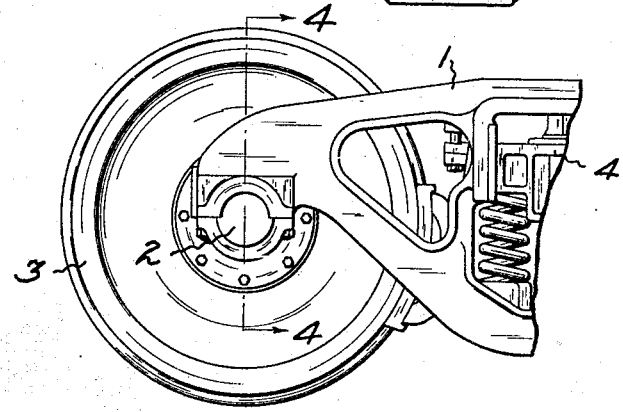
Fig. 2 is a fragmentary side elevation of one end of the truck.

Referring to the accompanying drawings, the truck of the present invention consists of side frame members 1 which are connected adjacent their ends by axles 2, supporting wheels 3 which are mounted to rotate on the axles 2, and a bolster 4 connecting the side frame members 1 substantially midway between the ends thereof and brake beams 5 of the usual type suspended from the frame members 1 in the space between the front and rear wheels.

The frame members 1 are each provided adjacent each end with a transverse axle receiving recess 6 which opens downwardly and which is of substantially rectangular form. The open lower end of each recess is closed by means of a cap 7 which has a substantially semi-cylindrical concavity to accommodate the axle and which is provided with end flanges to receive clamping bolts 8 by which the cap is secured to the frame member.

The horizontally disposed bottom face of the recess 6 is provided with a concave seat 9 which is formed on the surface of a cylinder whose axis is horizontally disposed and extends longitudinally of the frame member. Each of the axles is provided at each end with a bearing saddle 10 which fits in a circumferential groove 11 formed in the end of the axle, the groove 11 providing shoulders 12 and 13 which bear against the ends of the saddle 10 to hold the saddle against longitudinal movements with respect to the axle.

The axle 2 is permitted a slight rotative movement with respect to the saddle 10 by means of a loosely fitted key 14 and the saddle has upon the top thereof a cylindrical convex seat 15 which extends transversely of the axle and fits in the concave seat 9 of the frame member. The depth of the concave seat 9 in the frame member is slightly less than the height of the convex seat 15 on the saddle so that the inner and outer end portions of the saddle are spaced somewhat from the bottom wall of the recess 6 so that the axle and saddle may have a limited rocking movement in a vertical plane with respect to the side frame member. In order to exclude dirt from the spaces between the saddle and frame member which might interfere with the rocking movements, the frame member is preferably provided at the inner and outer sides thereof with a skirt 16 which overhangs the inner edge of the saddle and a skirt 17 which overhangs the outer end of the saddle and the outer end of the axle. The semi-cylindrical cavity of the cap 7 is of somewhat greater diameter than the diameter of the grooved portion of the axle to permit rocking movement of the axle in the frame member and the shoulders 12 and 13 at the inner and outer sides of the groove overhang the inner and outer edges of the cap to prevent collection of dirt between the cap and axle.

It will be observed that when a wheel of this truck encounters a high or low spot on an uneven track that certain movements are permitted while other movements are restrained; the movements permitted being that one end of an axle may move vertically, one end of the side frame also moves vertically, while the side frame remains in an upright position by rocking on the saddle. The saddle has a slight rotative movement about the axle which is permitted by the loose-fitting key between the axle and saddle. In spite of the movements mentioned, one end of the axle is restrained against advancing ahead of the other end of the axle by means of the convex surface 15 of the saddle 10 and the concave surface 9 of the side frame recess and the flat ends of the saddle 10 within the flat end walls of the side frame recess.

The vertical rocking movement of the axle in the frame members will, however, permit any corner of the truck to be lowered independently of the other corners without exerting bending stresses on either of the axles. The axles are rigidly held against endwise movements with respect to the side frame members by the interposed saddles 10, which are secured against longitudinal movement on the axle and which are held by the interengaging seats 9 and 15 against endwise movements in the frame members.

It will be apparent that the present invention provides a very simple mounting for the axles and frame members in the side frame members which relieves the axles of bending and torsional stresses due to raising and lowering of corners of the truck in passing over an uneven track and that this connection also maintains rigidity of the truck frame with respect to relative movements of the axle and frame members in planes other than the vertical planes of the axles.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A car truck having side frame members, and nonrotatable axles non-resiliently mounted at their ends in said frame members for limited rocking movements about axes extending longitudinally of the frame members.

2. A car truck having side frame members, axles extending transversely between said side frame members, and bearing members non-resiliently interposed between said axles and frame members, each bearing member being keyed to its axle and mounted for limited rocking movement in said frame member about an axis extending longitudinally of the frame members and substantially fixed with respect thereto.

3. A car truck having side frame members, axles and bearing members interposed between said axles and frame members, said bearing members and axles having interengaging parts holding them against relative angular movements about the axis of the axle and against relative movements longitudinally of the axle, said bearing members and frame members having interfitting convex and concave cylindrical bearing surfaces extending longitudinally of the frame members.

4. A car truck having side frame members, axles and bearing members interposed between said axles and frame members, said bearing members and axles having interengaging parts holding them against relative angular movements about the axis of the axle and against relative movements longitudinally of the axle, said bearing members being mounted in the frame members for vertical rocking movements in the planes of the axles about axes substantially fixed with respect to the frame members.

5. A car truck having side frame members, axles extending transversely between said side frame members, and means connecting the axles and frame members for relative rocking movements about axes extending longitudinally of the frame members and for holding the frame members substantially at right angles to the axles and against movements longitudinally of the axles.

6. In a car truck, an axle, a saddle mounted upon an end of the axle for limited rotative movement with respect to the axle and against movement longitudinally of the axle, said saddle having a cylindrical bearing surface upon the top thereof which extends transversely of the axle, and a side frame member having a recess to receive the saddle and a cylindrical bearing surface which engages the cylindrical bearing surface of the saddle, whereby the saddle and axle may have limited rocking movement in said frame member.

7. In a car truck, an axle, a saddle mounted upon an end of the axle for limited rotative movement with respect to the axle and against movement longitudinally of the axle, said saddle having flat vertically disposed parallel front and rear faces and having upon the top thereof a cylindrical bearing surface, the axis of which is substantially at right angles to the axle, and a side frame member having flat vertically disposed parallel side walls between which the saddle fits and having a cylindrical bearing surface in which the bearing surface of the saddle fits whereby the saddle and axle may have limited rocking movement in the frame member.

In testimony whereof I affix my signature.

CLAUS J. WERNER CLASEN.